United States Patent
Kato et al.

(10) Patent No.: US 7,392,127 B2
(45) Date of Patent: Jun. 24, 2008

(54) VEHICLE MOTION CONTROL DEVICE

(75) Inventors: Toshihisa Kato, Handa (JP); Junya Nagaya, Kariya (JP); Shinji Tsugawa, Obu (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 749 days.

(21) Appl. No.: 10/899,117

(22) Filed: Jul. 27, 2004

(65) Prior Publication Data

US 2005/0027426 A1 Feb. 3, 2005

(30) Foreign Application Priority Data

Jul. 30, 2003 (JP) ............................. 2003-282513

(51) Int. Cl.
*G06F 19/00* (2006.01)
*B60T 8/24* (2006.01)

(52) U.S. Cl. .............................. 701/70; 701/72; 303/146

(58) Field of Classification Search ........................ None
See application file for complete search history.

(56) References Cited

U.S. PATENT DOCUMENTS

| | | | |
|---|---|---|---|
| 6,086,168 A | | 7/2000 | Rump |
| 6,169,946 B1 * | | 1/2001 | Griessbach .................. 701/45 |
| 6,175,792 B1 * | | 1/2001 | Jones et al. .................. 701/37 |
| 6,349,247 B1 | | 2/2002 | Schramm et al. |
| 6,438,464 B1 * | | 8/2002 | Woywod et al. ............... 701/1 |
| 6,529,803 B2 * | | 3/2003 | Meyers et al. .................. 701/1 |
| 2004/0158368 A1 | | 8/2004 | Haas |
| 2004/0193352 A1 * | | 9/2004 | Ito et al. ........................ 701/70 |

FOREIGN PATENT DOCUMENTS

| | | |
|---|---|---|
| DE | 198 02 041 A1 | 7/1999 |
| DE | 102 08 619 A1 | 9/2003 |
| JP | 10-81215 | 3/1998 |

* cited by examiner

*Primary Examiner*—Michael J. Zanelli
(74) *Attorney, Agent, or Firm*—Buchanan Ingersoll & Rooney PC

(57) ABSTRACT

The vehicle motion control device of the invention utilizes that the detected lateral acceleration Gyd based upon the output from the lateral acceleration sensor takes a value obtained by adding a value corresponding to the roll angle to the actual lateral acceleration based upon the centrifugal force exerted on the vehicle and that the actual lateral acceleration can accurately be calculated and estimated, as the estimated lateral acceleration Gye, based upon the output from the yaw rate sensor, whereby this device judges that there is a tendency in which an excessive roll angle occurs on the vehicle to thereby execute the predetermined roll-over preventing control, when the increasing speed of the detected lateral acceleration Gyd exceeds the first predetermined value and the increasing speed of the estimated lateral acceleration Gye becomes smaller than the second predetermined value (<first predetermined value), i.e., when the value of the estimated lateral acceleration Gye is changed from its increasing state to the approximately constant state during when the detected lateral acceleration Gyd increases.

7 Claims, 10 Drawing Sheets

VEHICLE MOTION CONTROL DEVICE

BACKGROUND OF THE INVENTION

1. Field of the Invention

The present invention relates to a vehicle motion control device for preventing a roll angle of a vehicle from being excessive.

2. Description of the Prior Arts

There has conventionally been a demand for controlling a vehicle motion so as to prevent the running state of the vehicle from being unstable due to the occurrence of an excessive roll angle (an inclination angle in a roll direction from a horizontal direction of the vehicle body in this specification) on the vehicle. This roll angle depends upon the magnitude of an actual lateral acceleration that is a component of an acceleration actually exerted on the vehicle in the side-to-side direction of the vehicle body based upon centrifugal force exerted on the vehicle when the vehicle is in the turning state, and increases with the increase of the actual lateral acceleration. On the other hand, the magnitude of the actual lateral acceleration exerted on the vehicle is decreased by producing a yawing moment in the direction opposite to the turning direction of the vehicle or by decelerating the vehicle.

From the above, a vehicle motion control device disclosed in the patent document 1 has a lateral acceleration sensor for detecting an actual lateral acceleration exerted on the vehicle, wherein, when the vehicle is in a turning state and the actual lateral acceleration detected by the lateral acceleration sensor exceeds a predetermined roll-over preventing threshold value, it judges that there is a tendency of an occurrence of excessive roll angle caused on the vehicle, thereby executing a control for exerting predetermined braking force on the outer wheel in the turning direction of the vehicle. According to this device, a yawing moment is given to the vehicle in the direction opposite to the turning direction of the vehicle due to the predetermined braking force, whereby the magnitude of the actual lateral acceleration exerted on the vehicle is decreased, thereby being capable of preventing the occurrence of the excessive roll angle on the vehicle.

[Patent Document 1]

Japanese Unexamined Patent Application No. HEI10-81215

In general, the lateral acceleration sensor is mounted at a predetermined position of the vehicle body (for example, in the vicinity of the center of gravity of the vehicle) with a predetermined posture. It detects a value of a component of external force exerted on the vehicle in the side-to-side direction to obtain a lateral acceleration caused on the vehicle. Accordingly, in case where there is an error in the mounting orientation and mounting angle of the lateral acceleration sensor to the vehicle body and hence the direction of the lateral acceleration sensor that should be agreed with the side-to-side direction of the vehicle body does not actually agree with the side-to-side direction of the vehicle body, the lateral acceleration sensor cannot accurately detect the value of the component of the external force exerted on the vehicle in the side-to-side direction, with the result that it cannot accurately obtain the lateral acceleration exerted on the vehicle.

However, there inevitably exists an error in the form of the lateral acceleration sensor itself or in the form at the mounting section of the lateral acceleration sensor in the vehicle body, so that an error can inevitably be produced in the mounting orientation or mounting angle of the lateral acceleration sensor to the vehicle body. Accordingly, in the disclosed device, there may be the case where the control for exerting the braking force is not executed when it should be executed since the lateral acceleration is detected somewhat smaller, or the case where the control for exerting the braking force is executed when it should not be executed since the lateral acceleration is detected somewhat greater. In other words, it cannot accurately judge that there is a tendency that excessive roll angle occurs on the vehicle, resulting in that there may be the case where the occurrence of the excessive roll angle cannot suitably be prevented.

SUMMARY OF THE INVENTION

The present invention is accomplished to solve the above-mentioned problem, and aims to provide a vehicle motion control device that can accurately judge that there is a tendency in which an excessive roll angle occurs on a vehicle, thereby being capable of more suitably preventing an occurrence of an excessive roll angle.

A vehicle motion control device of the present invention comprises estimated lateral acceleration calculating means that obtains a motion state quantity showing a motion state of a vehicle and calculates, based upon the obtained motion state quantity, a lateral acceleration based upon centrifugal force exerted on the vehicle as an estimated lateral acceleration, a lateral acceleration sensor that obtains a lateral acceleration exerted on the vehicle as a detected lateral acceleration by detecting a value of a component of external force exerted on the vehicle in the side-to-side direction, excessive roll angle occurrence tendency judging means that judges that there is a tendency in which an excessive roll angle occurs on the vehicle by utilizing that the estimated lateral acceleration is changed from its increasing state to approximately constant state during when the detected lateral acceleration increases and specific process executing means that executes a specific process for preventing that the roll angle of the vehicle becomes excessive, when it is judged that there is a tendency in which the excessive roll angle occurs on the vehicle.

In this case, the estimated lateral acceleration calculating means is preferably configured to obtain a yaw rate of the vehicle as the motion state quantity and calculate the estimated lateral acceleration based upon the obtained yaw rate. Further, the specific process executing means is preferably configured to execute, as the specific process, a process for exerting braking force, that is for generating a yawing moment on the vehicle in the direction opposite to the turning direction of the vehicle, on a predetermined wheel of the vehicle.

Considering a process in which the roll angle increases from its small value to an excessive value due to the turning run of the vehicle, the roll angle generally increases with the increase in the centrifugal force (accordingly, actual lateral acceleration) exerted on the vehicle at the stage where there is no tendency that an excessive roll angle occurs on the vehicle. However, at a stage where there is a tendency that the excessive roll angle occurs on the vehicle, the roll angle generally can increase in spite of that the centrifugal force (accordingly, actual lateral acceleration) exerted on the vehicle hardly increases. Therefore, it can be judged that there is a tendency in which an excessive roll angle occurs on the vehicle by utilizing that the actual lateral acceleration is changed from its increasing state to approximately constant state during the process in which the roll angle increases.

On the other hand, the lateral acceleration based upon the centrifugal force exerted on the vehicle can accurately be calculated based upon the motion state quantity (for example, a yaw rate of the vehicle) showing the vehicle motion state, so that the value of the estimated lateral acceleration calculated by the estimated lateral acceleration calculating means can be equal to the value of the actual lateral acceleration. Accordingly, as the actual lateral acceleration is changed from its increasing state to approximately constant state, the estimated lateral acceleration can be changed from its increasing state to approximately constant state.

Further, the detected lateral acceleration obtained by detecting the value of the component of the external force (i.e., gravity and centrifugal force) exerted on the vehicle in the side-to-side direction of the vehicle body based upon the output of the lateral acceleration sensor takes a value greater than the actual lateral acceleration by an amount corresponding to the roll angle. More specifically, when a roll angle according to the centrifugal force occurs on the vehicle due to the centrifugal force exerted on the vehicle by the turning run, the component of the gravity exerted on the vehicle in the side-to-side direction of the vehicle body is caused according to the roll angle. Specifically, the value of the component of the external force exerted on the vehicle in the side-to-side direction of the vehicle body becomes a value obtained by adding the component of the gravity exerted on the vehicle in the side-to-side direction of the vehicle body according to the roll angle to the centrifugal force exerted on the vehicle. Therefore, the detected lateral acceleration based upon the output of the lateral acceleration sensor takes a value obtained by adding the value corresponding to the roll angle to the actual lateral acceleration based upon the centrifugal force exerted on the vehicle. Accordingly, the detected lateral acceleration also increases during when the roll angle increases, in spite of whether the actual lateral acceleration is in the increasing state or in the approximately constant state.

The present invention is accomplished based upon this concept. As described above, utilizing that the estimated lateral acceleration is changed from its increasing state to approximately constant state during the process in which the detected lateral acceleration increases, means that the fact, that the actual lateral acceleration is changed from its increasing state to the approximately constant state during when the roll angle increases, is utilized, thereby being capable of judging that there is a tendency in which an excessive roll angle occurs on the vehicle.

Moreover, this technique utilizes the increase (change) in the detected lateral acceleration, not the detected lateral acceleration itself based upon the output from the lateral acceleration sensor. On the other hand, even if there is an error in the mounting orientation or mounting angle of the lateral acceleration sensor to the vehicle body, the influence by this error is difficult to appear as the change in the value of the detected lateral acceleration. Therefore, this technique can bring more accurate judgement that there is a tendency in which an excessive roll angle occurs on the vehicle. Consequently, the specific process is suitably executed for preventing that the roll angle of the vehicle becomes excessive, thereby being capable of more suitably preventing the occurrence of the excessive roll angle.

In this case, the excessive roll angle occurrence tendency judging means is preferably configured to judge that there is a tendency in which an excessive roll angle occurs on the vehicle when the increasing speed of the detected lateral acceleration becomes greater than a first predetermined value and the increasing speed of the estimated lateral acceleration becomes smaller than a second predetermined value that is smaller than the first predetermined value.

The first predetermined value is set to a value that is great to a degree corresponding to a state in which the detected lateral acceleration substantially increases and the second predetermined value is set to a value that is small to a degree corresponding to the approximately constant state of the estimated lateral acceleration. This can surely detect that "the estimated lateral acceleration is changed from its increasing state to the approximately constant state during when the detected lateral acceleration increases", thereby being capable of more surely making a judgement that there is a tendency in which an excessive roll angle occurs on the vehicle.

Further, the excessive roll angle occurrence tendency judging means is preferably configured to calculate the deviation between the detected lateral acceleration and the estimated lateral acceleration as a lateral acceleration deviation, and to judge that there is a tendency in which an excessive roll angle occurs on the vehicle based upon the change in the changing speed of the lateral acceleration deviation. Specifically, the excessive roll angle occurrence tendency judging means is preferably configured to judge that there is a tendency in which an excessive roll angle occurs on the vehicle, when a ratio of the change in the changing speed of the lateral acceleration deviation to the change in the lateral acceleration deviation exceeds a predetermined reference value.

As explained above, the estimated lateral acceleration can take a value equal to the actual lateral acceleration and the detected lateral acceleration takes a value obtained by adding the value corresponding to the roll angle to the actual lateral acceleration, so that the lateral acceleration deviation can be a value representing the roll angle. Therefore, the changing speed (increasing speed) of the lateral acceleration deviation can be a value representing the changing speed (increasing speed) of the roll angle.

On the other hand, during a process in which the roll angle increases from its small value to the excessive value due to the turning run of the vehicle, the increasing speed of the roll angle generally changes (increases) when the vehicle motion is changed from the stage in which there is no tendency in which an excessive roll angle occurs on the vehicle to the stage in which there is a tendency in which an excessive roll angle occurs on the vehicle. Therefore, it can surely be detected that "the estimated lateral acceleration is changed from its increasing state to the approximately constant state during when the detected lateral acceleration increases" by utilizing the change in the increasing speed of the roll angle.

From the above, even the configuration for judging that there is a tendency in which an excessive roll angle occurs on the vehicle based upon the change (increase) in the changing speed of the lateral acceleration deviation as described above can more surely judge that there is a tendency in which an excessive roll angle occurs on the vehicle.

BRIEF DESCRIPTION OF THE DRAWINGS

FIG. 5 is a flowchart showing a routine executed by a CPU shown in FIG. 1 for calculating a wheel speed or the like;

DESCRIPTION OF THE PREFERRED EMBODIMENT

A preferred embodiment of a vehicle control device according to the present invention will be explained hereinbelow with reference to drawings.

First Embodiment

Figure 1:
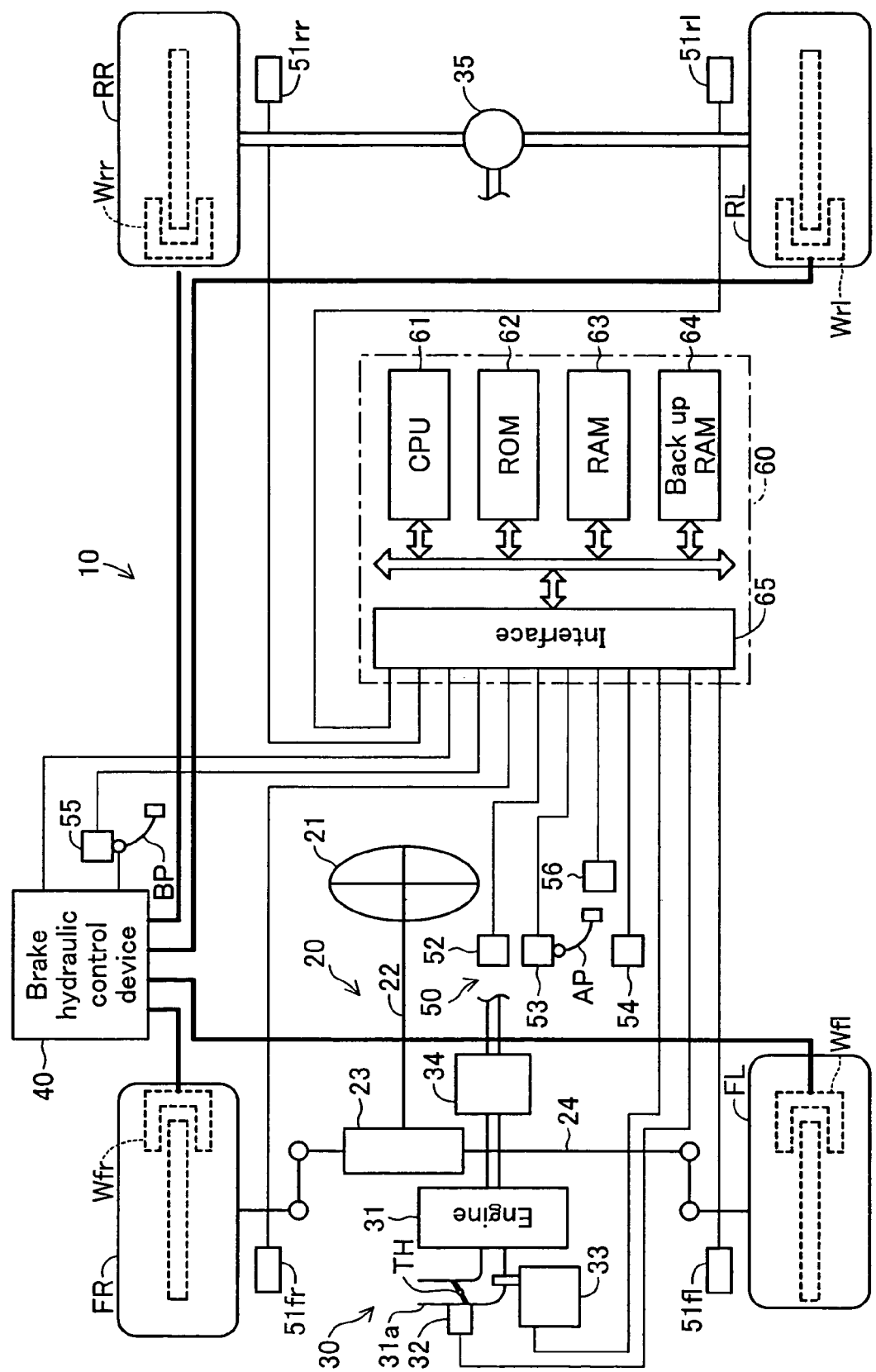
FIG. 1 is a schematic constructional view of a vehicle having mounted thereto a vehicle motion control device according to a first embodiment of the present invention.

FIG. 1 shows a schematic construction of a vehicle provided with a vehicle control device 10 according to the first embodiment of the invention. This vehicle is a four-wheel drive vehicle using a rear-wheel drive system and having two front wheels (front-left wheel FL and front-right wheel FR) that are steering wheels as well as non-driving wheels and two rear wheels (rear-left wheel RL and rear-right wheel RR) that are driving wheels.

The vehicle control device 10 is configured to include a front-wheel steering mechanism 20 for steering the steering wheels FL and FR, a driving force transmission section 30 that produces driving force and respectively transmits this driving force to each driving wheel RL and RR, a brake hydraulic control device 40 for producing braking force by a brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a known so-called hydraulic power steering device that generates assisting force for moving the tie rod according to the rotational torque of the column 22, thereby shifting the tie rod from the neutral position to the side-to-side direction of the vehicle by the assisting force in proportion to the steering angle θs from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening TA of a throttle valve TH that can modulate the cross-sectional area of the inlet path, a fuel injection device 33 including an injector that injects fuel to the vicinity of an inlet port not shown of the engine 31, a transmission 34 connected to the output shaft of the engine 31 and a differential gear 36 that suitably distributes and transmits the driving force transmitted from the transmission 34 to rear wheels RR and RL.

Figure 2:
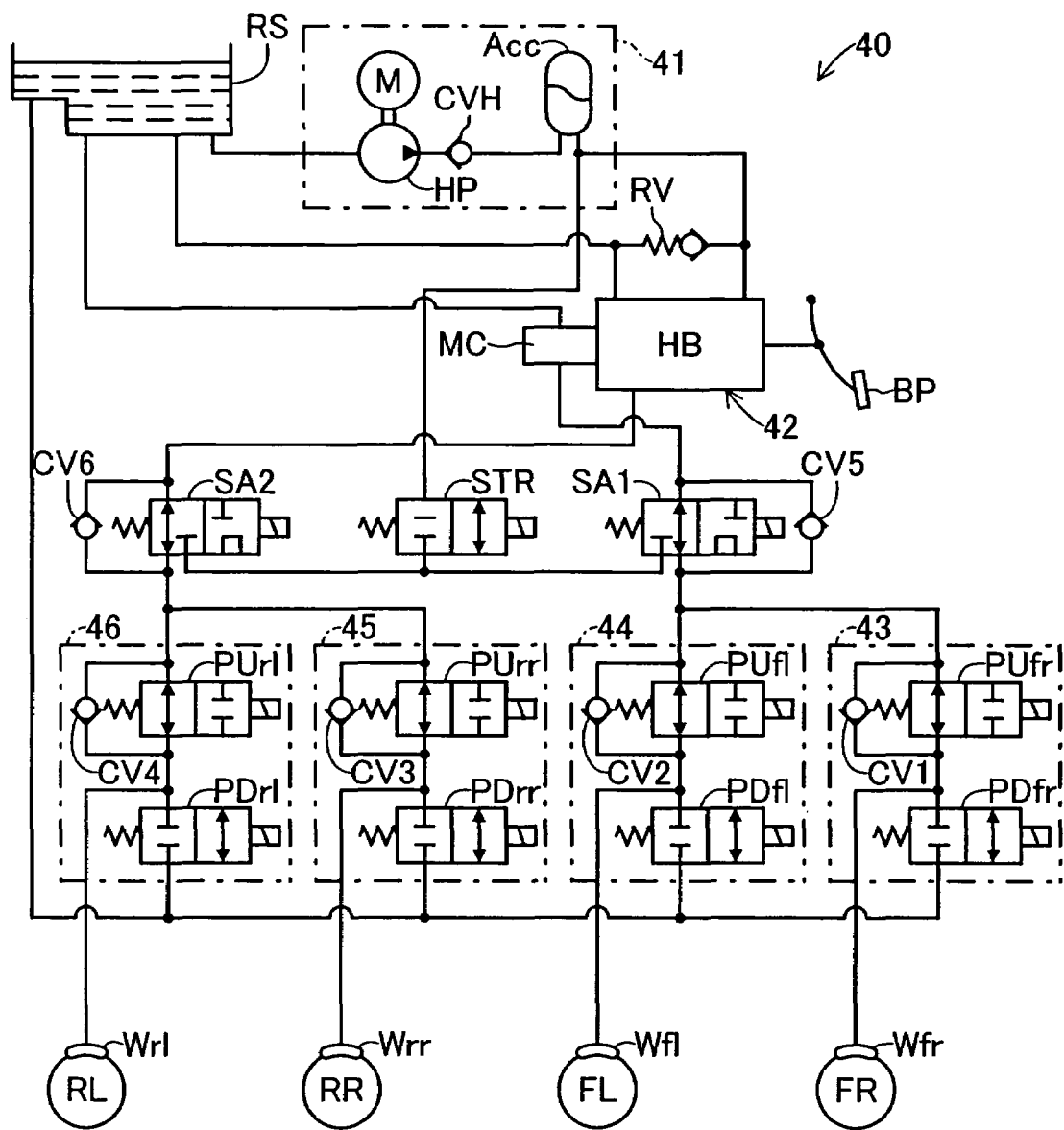
FIG. 2 is a schematic constructional view of a brake hydraulic control device shown in FIG. 1.

The brake hydraulic control device 40 whose construction is schematically shown in FIG. 2 is configured to include a high-pressure generating section 41, a brake fluid pressure generating section 42 that generates brake fluid pressure according to operating force on a brake pedal BP, and an FR brake fluid pressure adjusting section 43, an FL brake fluid pressure adjusting section 44, an RR brake fluid pressure adjusting section 45 and an RL brake fluid pressure adjusting section 46 that are capable of adjusting brake fluid pressure supplied respectively to wheel cylinders Wfr, Wfl, Wrr and Wrl each arranged at each wheel FR, FL, RR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 43 and the upstream side of the FL brake fluid pressure adjusting section 44. Similarly, a control valve SA2 that is a three-port two-position switching type solenoid-operated valve is arranged between the hydraulic booster HB and each of the upstream side of the RR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 43 and the upstream section of the FL brake fluid pressure adjusting section 44. When in the second position (in the actuated position), it functions to cut off the communication between the master cylinder MC and each of the upstream section of the FR brake fluid pressure adjusting section 43 and the upstream section of the FL brake fluid pressure adjusting section 44, but to establish the communication between the change-over valve STR and each of the upstream section of the FR brake fluid pressure adjusting section 43 and the upstream section of the FL brake fluid pressure adjusting section 44.

When the control valve SA2 is in the first position in FIG. 2 (in the non-actuated position), it functions to establish communication between the hydraulic booster HB and each of the upstream section of the RR brake fluid pressure adjusting section 45 and the upstream section of the RL brake fluid pressure adjusting section 46. When in the second position (in the actuated position), it functions to cut off the communication between the hydraulic booster HB and each of the upstream section of the RR brake fluid pressure adjusting section 45 and the upstream section of the RL brake fluid pressure adjusting section 46, but to establish the communication between the change-over valve STR and each of the upstream section of the RR brake fluid pressure adjusting section 45 and the upstream section of the RL brake fluid pressure adjusting section 46.

By this operation, master cylinder fluid pressure is supplied to each of the upstream section of the FR brake fluid pressure adjusting section 43 and the upstream section of the FL brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

The FR brake fluid pressure adjusting section 43 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 43 and the wheel cylinder Wfr, while it cuts off the communication between the upstream section of the FR brake fluid pressure adjusting section 43 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 43 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 43. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 43. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 44, RR brake fluid pressure adjusting section 45 and RL brake fluid pressure adjusting section 46 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 43 and the FL brake fluid pressure adjusting section 44 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control device 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control device 40 can increase only the brake fluid pressure in the wheel cylinder Wfr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control device 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51fl, 51fr, 51rl and 51rr as motion state quantity obtaining means each constructed by a rotary encoder that outputs a signal having a pulse every time each wheel FL, FR, RL and RR rotates at a predetermined angle, a steering angle sensor 52, serving as steering operating amount obtaining means, for detecting the angle of rotation from the neutral position of the steering 21 to output a signal showing a steering angle θs, an accelerator opening sensor 53 that detects an operating amount of an accelerator pedal AP operated by a driver and outputs a signal showing the operating amount Accp of the accelerator pedal AP, a lateral acceleration sensor 54 that detects a value of a component of external force exerted on the vehicle in the side-to-side direction of a vehicle body and outputs a signal Va showing the detected lateral acceleration Gyd (m/s$^2$) based upon this value, a brake switch 55 that detects whether the brake pedal BP is operated or not by the driver for outputting a signal showing that the braking operation is performed or not and a yaw rate sensor 56 that detects a yaw rate of the vehicle and outputs a signal Va showing the yaw rate Yr(1/s).

The steering angle θs detected by the steering angle sensor 52 is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position.

Figure 3:
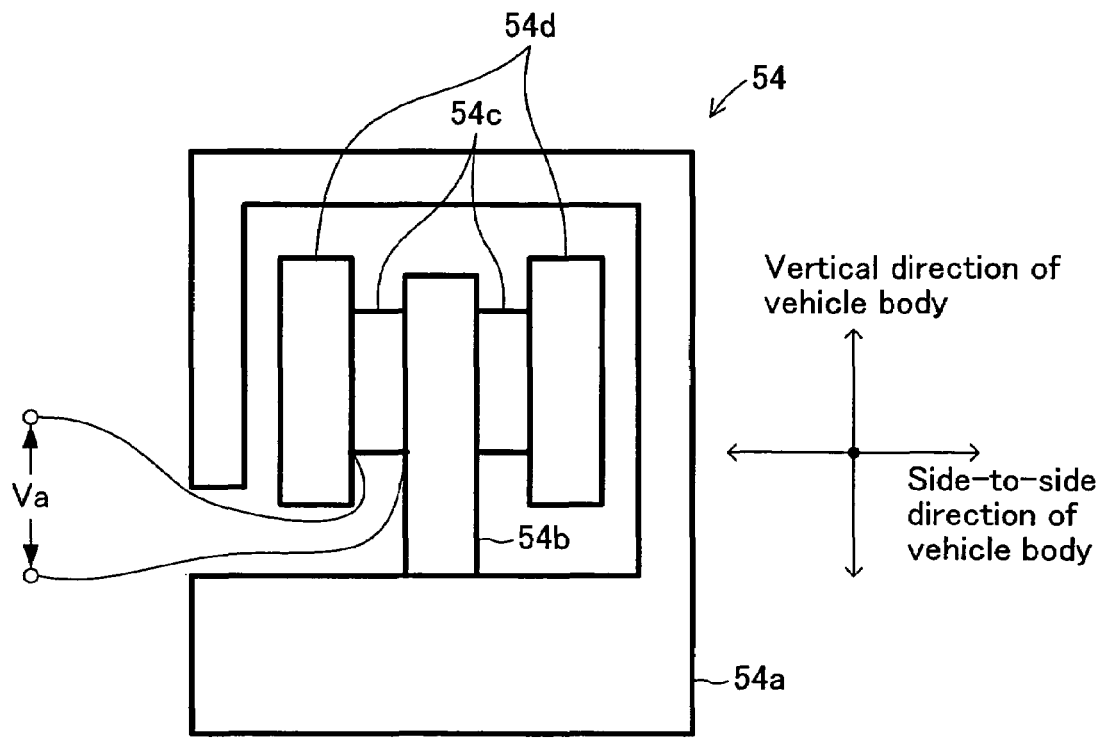
FIG. 3 is a schematic constructional view of a lateral acceleration sensor shown in FIG. 1.

The lateral acceleration sensor 54, the schematic construction of which is shown in FIG. 3, is composed of a base section 54a fixed to the vehicle body in the vicinity of the center of gravity of the vehicle and having a space inside, a rising member 54b that is disposed to rise toward the upward direction of the vehicle body from the base section 54a along the front-to-rear direction of the vehicle body in the space of the base section 54a and has an approximately rectangular shape, and dead weights 54d, 54d connected respectively to each face of the rising member 54b facing toward the side-to-side direction of the vehicle body via ceramic piezoelectric elements 54c, 54c.

The ceramic piezoelectric elements 54c, 54c generate a voltage (potential difference) Va according to a strain of the ceramic piezoelectric elements 54c, 54c in the side-to-side direction of the body that is produced according to a component value of external force (centrifugal force, gravity or the like) exerted on the dead weights 54d, 54d (accordingly, on the vehicle) in the side-to-side direction of the body. As explained above, the value of the component of the external force exerted on the vehicle in the side-to-side direction of the vehicle body takes a value obtained by adding the component of the gravity, that is caused according to the roll angle, exerted on the vehicle in the side-to-side direction of the vehicle body to the centrifugal force exerted on the vehicle. Therefore, the detected lateral acceleration Gyd (its absolute value) based upon the output Va from the lateral acceleration sensor 54 becomes a value obtained by adding a value corresponding to the roll angle to the actual lateral acceleration (accordingly, actual lateral acceleration) based upon the centrifugal force exerted on the vehicle.

The detected actual lateral acceleration Gyd is set to be a positive value when the external force in the rightward direction of the body is exerted on the dead weights 54d, 54d (accordingly, on the vehicle), i.e., when the centrifugal force is exerted in the rightward direction of the body due to the leftward turn of the vehicle so that the vehicle body is rolled in the rightward direction of the body, while it is set to be a negative value when the external force in the leftward direction of the body is exerted on the dead weights 54d, 54d (accordingly, on the vehicle), i.e., when the centrifugal force is exerted in the leftward direction of the body due to the rightward turn of the vehicle so that the vehicle body is rolled in the leftward direction of the body.

Further, the yaw rate Yr detected by the yaw rate sensor 56 takes a positive value when the vehicle turns in the leftward direction, while it takes a negative value when the vehicle turns in the rightward direction.

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 56, thereby supplying to the CPU 61 signals from the sensors 51 to 56 and transmitting a driving signal to each solenoid-operated valve and motor M of the brake hydraulic control device 40, the throttle valve actuator 32 and the fuel injection device 33 according to the instruction from the CPU 61.

By this operation, the throttle valve actuator 32 drives the throttle valve TH such that the opening TA thereof becomes a target throttle valve opening TAt that is set according to the operating amount Accp of the accelerator pedal AP, and the fuel injection device 33 injects fuel in a required amount so as to obtain a predetermined target air-fuel ratio (theoretical air-fuel ratio) concerning intake air mass according to the opening of the throttle valve TH.

[Outline of Vehicle Motion Control]

The vehicle motion control device 10 (simply referred sometimes to as "this device" hereinbelow) according to the first embodiment of the invention having the above-mentioned configuration calculates the target lateral acceleration Gyt (m/s$^2$) based upon a following formula (1) that is a theoretical formula as a predetermined rule directed from a vehicle motion model. The target lateral acceleration Gyt is set to the positive value when the vehicle turns in the leftward direction (when the steering angle θs (deg) is a positive value), while it is set to the negative value when the vehicle turns in the rightward direction (when the steering angle θs is a negative value). This theoretical formula is a formula for calculating a theoretical value of the lateral acceleration exerted on the vehicle when the vehicle turns with the steering angle and vehicle body speed constant (upon the normal circular turn).

$$Gyt=(Vso^2 \cdot \theta s)/(n \cdot I) \cdot (1/(1+Kh \cdot Vso^2)) \quad (1)$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, I is a wheel base (m) of the vehicle that is a constant value determined by the vehicle body, and Kh is a stability factor ($s^2/m^2$) that is a constant value determined by the vehicle body.

Further, this device also calculates a lateral acceleration deviation ΔGy ($m/s^2$), based upon the formula (2) described later, that is a deviation between the absolute value of the target lateral acceleration Gyt calculated as described above and the absolute value of the detected actual lateral acceleration Gy obtained by the lateral acceleration sensor 54.

[Formula 2]

$$\Delta Gy = |Gyt| - |Gy| \quad (2)$$

[Understeer Restraining Control]

When the value of the lateral acceleration deviation ΔGy is a positive value, the vehicle is in a state where the turning radius is greater than the turning radius of when the target lateral acceleration Gyt is assumed to be caused on the vehicle (hereinafter referred to as "understeer state"), whereby this device executes an understeer restraining control (hereinafter sometimes referred to as "US restraining control") for restraining the understeer state. Specifically, this device exerts predetermined braking force on the rear wheel at the inner side of the turning direction according to the lateral acceleration deviation ΔGy, thereby forcibly producing a yawing moment on the vehicle in the direction same as the turning direction. This allows to increase the absolute value of the detected actual lateral acceleration Gy, so that the detected lateral acceleration Gyd is controlled to be close to the target lateral acceleration Gyt.

[Oversteer Restraining Control]

Moreover, when the value of the lateral acceleration deviation ΔGy is a negative value, the vehicle is in a state where the turning radius is smaller than the turning radius of when the target lateral acceleration Gyt is assumed to be caused on the vehicle (hereinafter referred to as "oversteer state"), whereby this device executes an oversteer restraining control (hereinafter sometimes referred to as "OS restraining control") for restraining the oversteer state. Specifically, this device exerts predetermined braking force on the front wheel at the outer side of the turning direction according to the lateral acceleration deviation ΔGy, thereby forcibly producing a yawing moment on the vehicle in the direction opposite to the turning direction. This allows to decrease the absolute value of the detected lateral acceleration Gyd, so that the detected lateral acceleration Gyd is controlled to be close to the target lateral acceleration Gyt.

As described above, the understeer restraining control or the oversteer restraining control is executed, whereby this device controls the braking force that should be exerted on each wheel, thereby causing a predetermined yawing moment on the vehicle in the direction where the detected lateral acceleration Gyd gets close to the target lateral acceleration Gyt calculated as described above.

[Roll-over Preventing Control]

As described before, the detected lateral acceleration Gyd based upon the output from the lateral acceleration sensor 54 takes a value obtained by adding a value corresponding to the roll angle to the actual lateral acceleration. On the other hand, the actual lateral acceleration can accurately be calculated and estimated as the estimated lateral acceleration Gye based upon the yaw rate Yr. Specifically, the estimated lateral acceleration Gye ($m/s^2$) can be calculated according to a formula (3) described below from the yaw rate Yr detected by the yaw rate sensor 56 and the estimated vehicle body speed Vso. It should be noted that, as can be understood from the formula (3), the estimated lateral acceleration Gye is calculated so as to take a positive value when the vehicle turns in the leftward direction and take a negative value when the vehicle turns in the rightward direction, like the detected lateral acceleration Gyd obtained by the lateral acceleration sensor 54.

$$Gye = Yr \cdot Vso \quad (3)$$

As previously explained, during a process in which the roll angle increases from its small value to an excessive value due to the turning run of the vehicle, the roll angle generally increases with the increase in the centrifugal force (accordingly, actual lateral acceleration) exerted on the vehicle at the stage where there is no tendency that an excessive roll angle occurs on the vehicle (hereinafter sometime referred to as "A region"). However, at a stage where there is a tendency that the excessive roll angle occurs on the vehicle (hereinafter sometime referred to as "B region"), the roll angle generally can increase in spite of that the centrifugal force (accordingly, actual lateral acceleration) exerted on the vehicle hardly increases.

Figure 4:
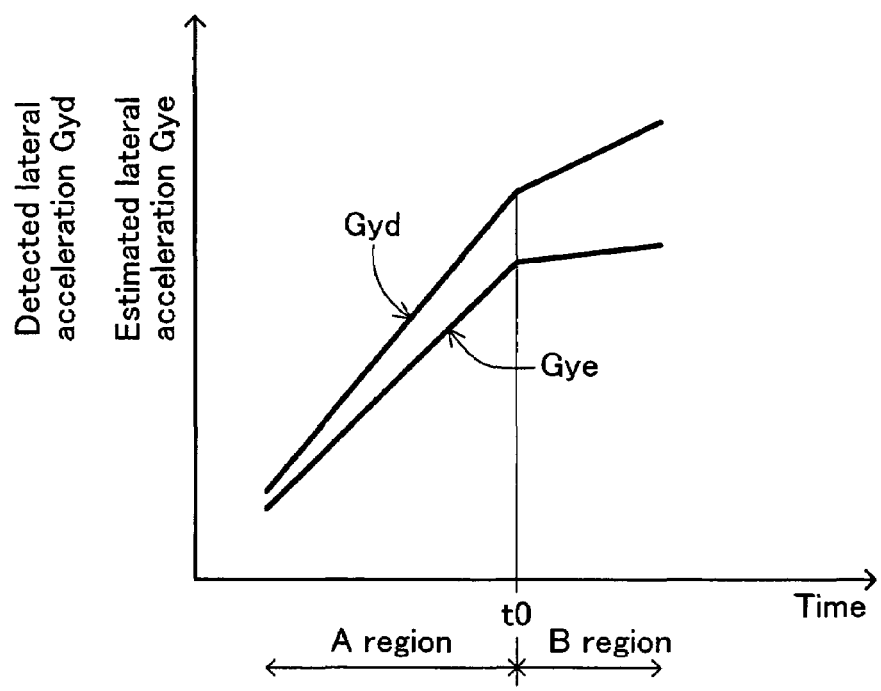
FIG. 4 is a time chart showing a change of an estimated lateral acceleration and detected actual lateral acceleration in case where a vehicle is turned as a vehicle body speed is gradually and suitably increased with a steering angle kept to a predetermined value and in case where a vehicle motion is changed from a stage in which there is no tendency that an excessive roll angle occurs on the vehicle to a stage in which there is a tendency that an excessive roll angle occurs on the vehicle.

The vehicle motion at this A region and B region will be explained with reference to FIG. 4 by using the estimated lateral acceleration Gye and the detected lateral acceleration Gyd. FIG. 4 is a time chart showing a change in the estimated lateral acceleration Gye and the detected-lateral acceleration Gyd in case where the vehicle is turned as the vehicle body is gradually and suitably increased with the steering angle θs kept to be a predetermined positive constant value and in case where the vehicle motion is changed from the motion at the A region to the motion at the B region at a time t0.

As shown in FIG. 4, the actual lateral acceleration increases with the increase in the body speed, resulting in that the estimated lateral acceleration Gye also increases at the A region by the time t0. Further, the roll angle increases with the increase in the actual lateral acceleration, whereby the detected lateral acceleration Gyd increases with a speed faster than the estimated lateral acceleration Gye by an amount corresponding to the increasing speed of the roll angle.

On the other hand, at the B region after the time t0, the roll angle increases although the actual lateral acceleration hardly increases, with the result that the detected lateral acceleration Gyd keeps increasing according to the increase in the roll angle but the estimated lateral acceleration Gye is kept to be approximately constant.

From the above, it can be judged that the vehicle starts the motion at the B region only by detecting that the estimated lateral acceleration Gye (its absolute value) is changed from its increasing state to the approximately constant state during when the detected lateral acceleration Gyd (its absolute value) increases, and hence, it can be judged that there is a tendency that an excessive roll angle occurs on the vehicle.

This device obtains one after another the increasing speed DGyd of the detected lateral acceleration Gyd (its absolute value) and the increasing speed DGye of the estimated lateral acceleration Gye (its absolute value). When the increasing speed DGyd of the detected lateral acceleration is greater than a first predetermined value DGydref that is a positive value great to a degree corresponding to a state in which the detected lateral acceleration Gyd substantially increases and the increasing speed DGye of the estimated lateral acceleration Gye is smaller than a second predetermined value DGyeref (<DGydref) that is a positive value small to a degree corresponding to a state in which the estimated lateral acceleration Gye is approximately constant, this device judges that there is a tendency an excessive roll angle occurs on the vehicle.

When this device judges that there is a tendency an excessive roll angle occurs on the vehicle, it executes a roll-over preventing control that corresponds to a specific process for preventing the roll angle from being excessive. Specifically, this device generates predetermined braking force according to the absolute value of the detected lateral acceleration Gyd on the front wheel at the outer side of the turning direction for forcibly producing a yawing moment in the direction opposite to the turning direction. This allows to decrease the absolute value of the actual lateral acceleration, thereby restraining the increase in the roll angle. In case where the roll-over preventing control is executed, the above-mentioned understeer restraining control and the oversteer restraining control are not executed.

As described above, this device executes the understeer restraining control, oversteer restraining control and roll-over preventing control (hereinafter generically referred to as "stability control upon turning"). Further, when any one of an anti-skid control, front-rear braking force distribution control and traction control described later is also required to be executed upon executing the stability control upon turning, this device finally determines the braking force that should be exerted on each wheel by considering also the braking force that should be exerted on each wheel for executing any one of the above-mentioned controls. The above description is about the outline of the vehicle motion control.

[Actual Operation]

Subsequently, the actual operation of the vehicle control device 10 of the present invention and having the above-mentioned construction will be explained hereinbelow with reference to FIGS. 5 to 10 showing routines with flowcharts executed by the CPU 61 of the electrical control apparatus 60. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 5:
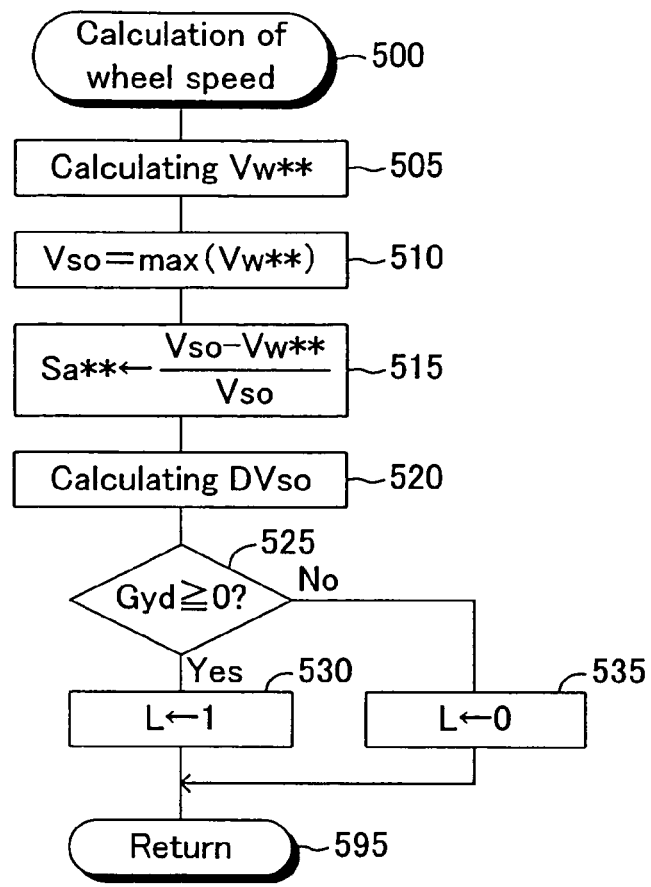

The CPU 61 repeatedly executes a routine shown in FIG. 5 for calculating the wheel speed Vw or the like once every predetermined period. Accordingly, the CPU 61 starts the process from a step 500 at a predetermined timing, and then proceeds to a step 505 to respectively calculate the wheel speed (outer peripheral speed of each wheel) Vw of each wheel FR or the like. Specifically, the CPU 61 calculates the respective wheel speeds Vw of each wheel FR or the like based upon a time interval of a pulse possessed by a signal outputted from each wheel speed sensor 51****.

Then, the CPU 61 moves to a step 510 to calculate the maximum value among the wheel speeds Vw of each wheel FR as the estimated body speed Vso. It is to be noted that the average value of the wheel speeds Vw of each wheel FR may be calculated as the estimated body speed Vso.

Then, the CPU 61 moves to a step 515 to calculate an actual slip ratio Sa of every wheel based upon the estimated body speed Vso calculated at the step 510, the value of the wheel speeds Vw of each wheel FR or the like calculated at the step 505 and the formula described in the step 515. This actual slip ratio Sa** is used for calculating the braking force that should be exerted on each wheel as described later.

Then, the CPU 61 proceeds to a step 520 for calculating an estimated vehicle body acceleration DVso that is a time derivative value of the estimated body speed Vso based upon a formula (4) described later. In the formula (4), Vso1 is the previous estimated body speed calculated at the step 510 at the time of the previous execution of this routine, while Δt is the above-mentioned predetermined time that is the operation period of this routine.

$$DVso=(Vso-Vso1)/\Delta t \quad (4)$$

Then, the CPU 61 moves to a step 525 to determine whether the detected lateral acceleration Gyd obtained by the lateral acceleration sensor 54 is not less than "0" or not. If the detected lateral acceleration Gyd is not less than "0", the CPU 61 makes "YES" determination at the step 525, and then, proceeds to a step 530 to set a turning direction indicating flag L to "1". Further, if the detected lateral acceleration Gyd is a negative value, the CPU 61 makes "NO" determination at the step 525, and then, proceeds to a step 535 to set the turning direction indicating flag L to "0".

The turning direction indicating flag L represents here that the vehicle turns in the leftward direction or rightward direction. When the value thereof is "1", it indicates that the vehicle turns in the leftward direction, while it indicates that the vehicle turns in the rightward direction when the value thereof is "1". Accordingly, the turning direction of the vehicle is specified by the value of the turning direction indicating flag L. Then, the CPU 61 moves to a step 595 to temporarily terminate this routine. After that, the CPU 61 repeatedly executes the steps in FIG. 5.

Subsequently explained is the calculation of the lateral acceleration deviation. The CPU 61 repeatedly executes a routine shown in FIG. 6 once every predetermined period. Accordingly, the CPU 61 starts the process from a step 600 at a predetermined timing, and then proceeds to a step 605 to calculate the target lateral acceleration Gyt based upon the value of the steering angle θs obtained by the steering angle sensor 52, the value of the estimated body speed Vso calculated at the step 510 in FIG. 5 and the formula described in the step 605 and corresponding to the right side of the formula (1).

Then, the CPU 61 proceeds to a step 610 to calculate the lateral acceleration deviation ΔGy based upon the value of the target lateral acceleration Gyt, the value of the detected lateral acceleration Gyd obtained by the lateral acceleration sensor 54 and the formula described in the step 610 and corresponding to the right side of the formula (2). Then, the CPU 61 proceeds to a step 695 to temporarily terminate this routine.

Subsequently explained is the calculation of the target slip ratio of each wheel required to determine the braking force that should be exerted on each wheel upon executing only the above-mentioned roll-over preventing control. The CPU 61 repeatedly executes a routine shown in FIG. 7 once every predetermined period. Accordingly, the CPU 61 starts the process from a step 700 at a predetermined timing, and then proceeds to a step 705 to calculate the estimated lateral acceleration Gye based upon the yaw rate Yr obtained from the yaw rate sensor 56, the calculated estimated vehicle body speed Vso and the formula described in the step 705 based upon the formula (3).

Then, the CPU 61 moves to a step 710 to obtain the increasing speed DGyd of the detected lateral acceleration based upon the detected lateral acceleration Gyd detected by the lateral acceleration sensor 54, the last-time value Gydb of the detected lateral acceleration renewed at a step 755 described later during the execution of the last-time this routine and the formula described in the step 710. The symbol Δt is the predetermined time that is an operation period of this routine.

Similarly, the CPU 61 obtains the increasing speed DGye of the estimated lateral acceleration based upon the estimated lateral acceleration Gye calculated at the step 705, the last-time value Gyeb of the estimated lateral acceleration renewed at the step 755 described later during the execution of the last-time this routine and the formula described in the step 715. The symbol Δt is the predetermined time that is an operation period of this routine.

Then, the CPU 61 proceeds to a step 720 to determine whether the increasing speed DGyd of the detected lateral acceleration obtained at the step 710 is greater than the first predetermined value DGydref and the increasing speed DGye of the estimated lateral acceleration obtained at the step 715 is smaller than the second predetermined value DGyeref.

It is supposed that the condition at the step 720 is established. The CPU 61 makes "YES" determination at the step 720 to proceed to a step 725 and the following steps for calculating a target slip ratio of each wheel upon executing the aforesaid roll-over preventing control. When moving to the step 725, the CPU 61 obtains control volume Gr for the roll-over preventing control based upon the absolute value of the detected lateral acceleration Gyd. This control volume Gr for the roll-over preventing control is obtained, for example, as a value monotonously increasing with the increase of the absolute value of the detected lateral acceleration Gyd. Subsequently, the CPU 61 proceeds to a step 730 to determine whether the turning direction indicating flag L is "1" or not.

When the turning direction indicating flag L is "1" in the judgement of the step 730, the CPU 61 proceeds to a step 735 to set a value obtained by multiplying a coefficient Kf that is a positive constant value by the value of the control volume Gr for the roll-over preventing control calculated at the step 725, as the target slip ratio Stfr of the front-right wheel FR, and set the target slip ratios Stfl, Stfl and Strr of the other wheels FL, RL and RR to "0". Then, the CPU 61 proceeds to a step 745. This process allows to set the target slip ratio corresponding to the absolute value of the detected lateral acceleration Gyd only to the front-right wheel FR corresponding to the front wheel at the outer side of the turning direction in case where the vehicle turns in the leftward direction.

On the other hand, when the turning direction indicating flag L is "0" at the judgement of the step 730, the CPU 61 moves to a step 740 to set a value obtained by multiplying the coefficient Kf by the value of the control volume Gr for the roll-over preventing control, as the target slip ratio Stfl of the front-left wheel FR, and set the target slip ratios Stfr, Strl and Strr of the other wheels FR, RL and RR to "0". Then, the CPU 61 proceeds to the step 745. This process allows to set the target slip ratio corresponding to the absolute value of the detected lateral acceleration Gyd only to the front-left wheel FL corresponding to the front wheel at the outer side of the turning direction in case where the vehicle turns in the rightward direction.

When moving to the step 745, the CPU 61 sets the value of a roll-over preventing control now-executing flag ROLL to "1", and then, proceeds to a step 755. The roll-over preventing control now-executing flag ROLL indicates that the roll-over preventing control is being executed when the value thereof is "1", and that the roll-over preventing control is not executed when the value thereof is "0".

On the other hand, it is supposed that the condition at the step 720 is not established. The CPU 61 makes "NO" determination at the step 720 to proceed to a step 750 for setting the value of the roll-over preventing control now-executing flag ROLL to "0", and then, immediately proceeds to the step 755. When moving to the step 755, the CPU 61 stores the (this-time) value of the detected lateral acceleration Gyd as the last-time value Gydb of the detected lateral acceleration and the (this-time) value of the estimated lateral acceleration Gye as the last-time value Gyeb of the estimated lateral acceleration, and then, proceeds to the step 795 to temporarily terminate this routine. In case where the condition at the step 720 is established, the target slip ratio of each wheel that is required to determine the braking force that should be exerted on each wheel upon executing only the roll-over preventing control is decided as described above.

Subsequently explained is the calculation of the target slip ratio of each wheel required to determine the braking force that should be exerted on each wheel upon executing only the above-mentioned OS-US restraining control. The CPU 61 repeatedly executes a routine shown in FIG. 8 once every predetermined period. Accordingly, the CPU 61 starts the process from a step 800 at a predetermined timing, and then proceeds to a step 805 to determine whether the value of the roll-over preventing control now-executing flag ROLL is "0" or not. If the CPU 61 makes "NO" determination (i.e., if the roll-over preventing control is being executed), it immediately proceeds to a step 895 to terminate this routine.

The explanation is continued supposing that the value of the roll-over preventing control now-executing flag ROLL is "0". The CPU 61 makes "YES" determination at the step 805, and then, proceeds to a step 810 to calculate control volume G for the OS-US restraining control based upon the absolute value of the lateral acceleration deviation ΔGy and the table described in the step 810. As shown in the table described in the step 810, the control volume G for the OS-US restraining control is set to "0" when the absolute value of the lateral acceleration deviation ΔGy is not more than the value Gy1. On the other hand, it is set so as to linearly change from "0" to a positive constant value G1 as the absolute value of the lateral acceleration deviation ΔGy is changed from the value Gy1 to a value Gy2 when the absolute value of the lateral acceleration deviation ΔGy is not less than the value Gy1 and not more than the value Gy2. Further, it is set so as to keep the positive constant value G1 when the absolute value of the lateral acceleration deviation ΔGy is not less than the value Gy2. In other words, the OS-US restraining control is not executed when the absolute value of the lateral acceleration deviation ΔGy is not less than the value Gy1, while the control volume G for the OS-US restraining control is determined according to the absolute value of the lateral acceleration deviation ΔGy based upon the table described in the step 810 when the absolute value of the lateral acceleration deviation ΔGy is not less than the value Gy1.

Figure 6:
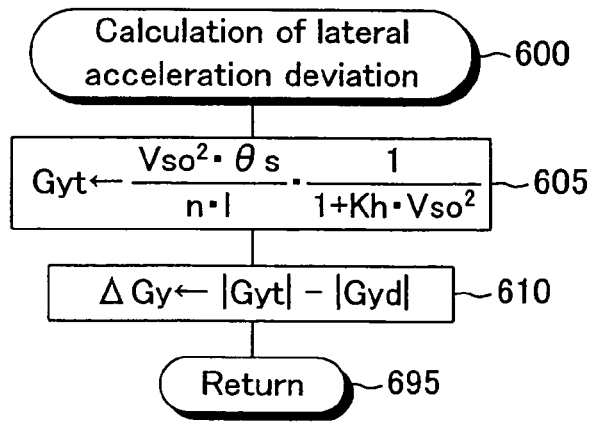
FIG. 6 is a flowchart executed by the CPU shown in FIG. 1 for calculating a lateral acceleration deviation.

Then, the CPU 61 proceeds to a step 815 to determine whether the value of the lateral acceleration deviation ΔGy calculated at the step 610 in FIG. 6 is not less than "0" or not. When the value of the lateral acceleration deviation ΔGy is not less than "0", the CPU 61 judges that the vehicle is in the understeer state as previously explained, whereby it moves to a step 820 for calculating the target slip ratio of each wheel upon executing the understeer restraining control, thus determining whether the value of the turning direction indicating flag L is "1" or not.

When the turning direction indicating flag L is "1" in the judgement of the step 820, the CPU 61 proceeds to a step 825 to set a value obtained by multiplying a coefficient Kb that is a positive constant value by the value of the control volume G for the OS-US restraining control calculated at the step 810, as the target slip ratio Strl of the rear-left wheel RL, and set the target slip ratios Stfl, Stfr and Strr of the other wheels FL, FR and RR to "0". Then, the CPU 61 proceeds to a step 895 to temporarily terminate this routine. This process allows to set the target slip ratio corresponding to the absolute value of the lateral acceleration deviation ΔGy only to the rear-left wheel RL corresponding to the rear wheel at the inside of the turning direction in case where the vehicle turns in the leftward direction.

On the other hand, when the turning direction indicating flag L is "0" at the judgement of the step 820, the CPU 61 moves to a step 830 to set a value obtained by multiplying the coefficient Kb by the value of the control volume G for the OS-US restraining control calculated at the step 810, as the target slip ratio Strr of the rear-right wheel RR, and set the target slip ratios Stfl, Stfr and Strl of the other wheels FL, FR and RL to "0". Then, the CPU 61 proceeds to the step 895 to temporarily terminate this routine. This process allows to set the target slip ratio corresponding to the absolute value of the lateral acceleration deviation ΔGy only to the rear-right wheel RR corresponding to the rear wheel at the inside of the turning direction in case where the vehicle turns in the rightward direction.

On the other hand, when the value of the lateral acceleration deviation ΔGy is a negative value in the judgement at the step 815, the CPU 61 judges that the vehicle is in the oversteer state as previously explained, whereby it moves to a step 835 for calculating the target slip ratio of each wheel upon executing the oversteer restraining control, thus determining whether the value of the turning direction indicating flag L is "1" or not.

When the turning direction indicating flag L is "1" in the judgement of the step 835, the CPU 61 proceeds to a step 840 to set a value obtained by multiplying a coefficient Kf that is a positive constant value by the value of the control volume G for the OS-US restraining control calculated at the step 810, as the target slip ratio Stfr of the front-right wheel FR, and set the target slip ratios Stfl, Strl and Strr of the other wheels FL, RL and RR to "0". Then, the CPU 61 proceeds to the step 895 to temporarily terminate this routine. This process allows to set the target slip ratio corresponding to the absolute value of the lateral acceleration deviation ΔGy only to the front-right wheel FR corresponding to the front wheel at the outside of the turning direction in case where the vehicle turns in the leftward direction.

On the other hand, when the turning direction indicating flag L is "0" at the judgement of the step 835, the CPU 61 moves to a step 845 to set a value obtained by multiplying the coefficient Kf by the value of the control volume G for the OS-US restraining control calculated at the step 810, as the target slip ratio Stfl of the front-left wheel FL, and set the target slip ratios Stfr, Strl and Strr of the other wheels FR, RL and RR to "0". Then, the CPU 61 proceeds to the step 895 to temporarily terminate this routine. This process allows to set the target slip ratio corresponding to the absolute value of the lateral acceleration deviation ΔGy only to the front-left wheel FL corresponding to the front wheel at the outside of the turning direction in case where the vehicle turns in the rightward direction. As described above, the target slip ratio of each wheel required to determine the braking force that should be exerted on each wheel upon executing only the OS-US restraining control is determined in case where the roll-over preventing control is not executed.

Subsequently explained is a setting of a control mode of the vehicle. The CPU 61 repeatedly executes a routine shown in FIG. 9 once every predetermined period. Accordingly, the CPU 61 starts the process from a step 900 at a predetermined timing, and then proceeds to a step 905 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, the CPU 61 judges that the anti-skid control is necessary in case where the state that the brake pedal BP is operated is shown by the brake switch 55 and the value of the actual slip ratio Sa of the specific wheel calculated at the step 515 in FIG. 5** is not less than the positive predetermined value.

When the anti-skid control is judged to be necessary at the judgement of the step 905, the CPU 61 moves to a step 910 to set "1" to a variable Mode for setting a control mode that simultaneously executes the stability control upon turning and the anti-skid control, and then, proceeds to the following step 950.

On the other hand, when the anti-skid control is judged to be unnecessary at the judgement of the step 905, the CPU 61 moves to a step 915 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-to-rear direction of the vehicle with the brake pedal BP operated. The detail of the front-rear braking force distribution control is well-known, so that the detailed explanation thereof is omitted here.

Specifically, the CPU 61 judges at the step 915 that the front-rear braking force distribution control is needed, in case where the brake switch 55 shows that the brake pedal BP is operated and the case where the estimated body speed DVso calculated at the step 520 of FIG. 5 is a negative value and its absolute value is not less than the predetermined value.

When the front-rear braking force distribution control is needed in the judgement at the step 915, the CPU 61 proceeds to a step 920 where "2" is set to a variable Mode for setting a control mode for executing both the stability control upon turning and the front-rear braking force distribution control. Then, the CPU 61 proceeds to the next step 950.

When the front-rear braking force distribution control is not needed in the judgement at the step 915, the CPU 61 proceeds to a step 925 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 925 that the traction control is needed, in case where the brake switch 55 shows that the brake pedal BP is not operated and the case where the actual slip ratio Sa of the specific wheel calculated at the step 515 of FIG. 5** is a negative value and its absolute value is not less than the predetermined value.

When the traction control is needed in the judgement at the step 925, the CPU 61 proceeds to a step 930 where "3" is set to a variable Mode for setting a control mode that executes both the stability control upon turning and the traction control. Then, the CPU 61 proceeds to the next step 950.

Figure 7:
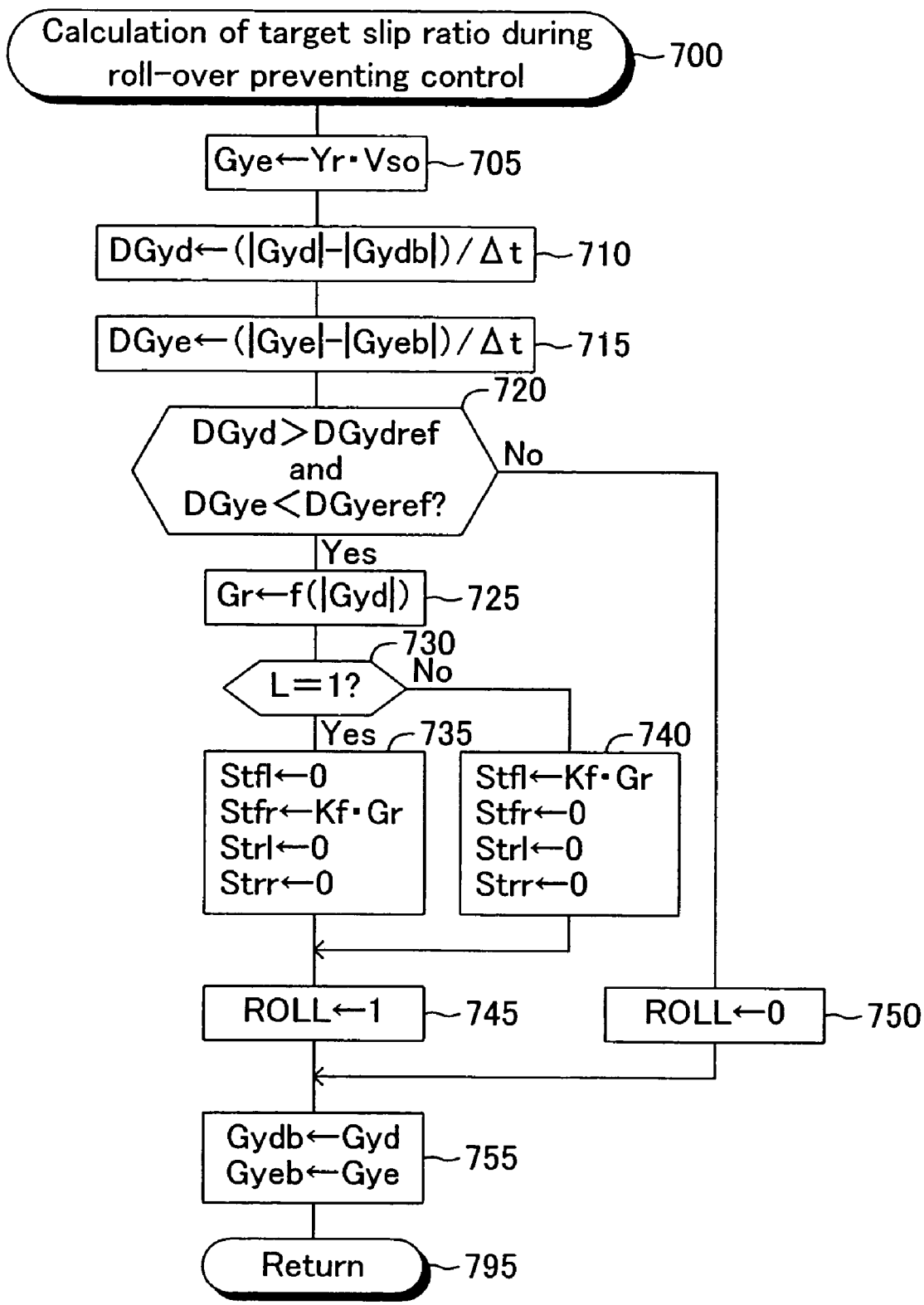
FIG. 7 is a flowchart executed by the CPU shown in FIG. 1 for calculating a target slip ratio during a roll-over preventing control.

When the traction control is not needed in the judgement at the step 925, the CPU 61 proceeds to a step 935 for determining whether the stability control turning is needed or not at present. Specifically, the CPU 61 determines that the stability control upon turning is needed at the step 935 in case where the value of the roll-over preventing control now-executing flag ROLL is "0" or in case where the absolute value of the lateral acceleration deviation ΔGy is not less than the value Gy1 in the table described in the step 810 in FIG. 8, since there exists the specific wheel wherein the value of the target slip ratio St** set in FIG. 7 or FIG. 8 is not "0".

When the stability control upon turning is needed in the judgement at the step 935, the CPU 61 proceeds to a step 940 where "4" is set to a variable Mode for setting a control mode executing only the stability control upon turning. Then, the CPU 61 proceeds to the next step 950. On the other hand, when it is determined that the stability control upon turning is not needed in the judgement of the step 935, the CPU 61 proceeds to a step 945 where "5" is set to a variable Mode for setting a non-control mode wherein the vehicle motion control is not executed, and then, proceeds to the next step 950. In this case, the specific wheel that should be controlled is not present.

When the CPU 61 proceeds to the step 950, it sets "1" to a flag CONT corresponding to a wheel to be controlled, while sets "0" to a flag CONT corresponding to a wheel not to be controlled, that is not the wheel to be controlled. The wheel to be controlled at this step 950 is a wheel that is required to control at least one of the corresponding pressure increasing valve PU and the pressure decreasing valve PD shown in FIG. 2.

Figure 8:
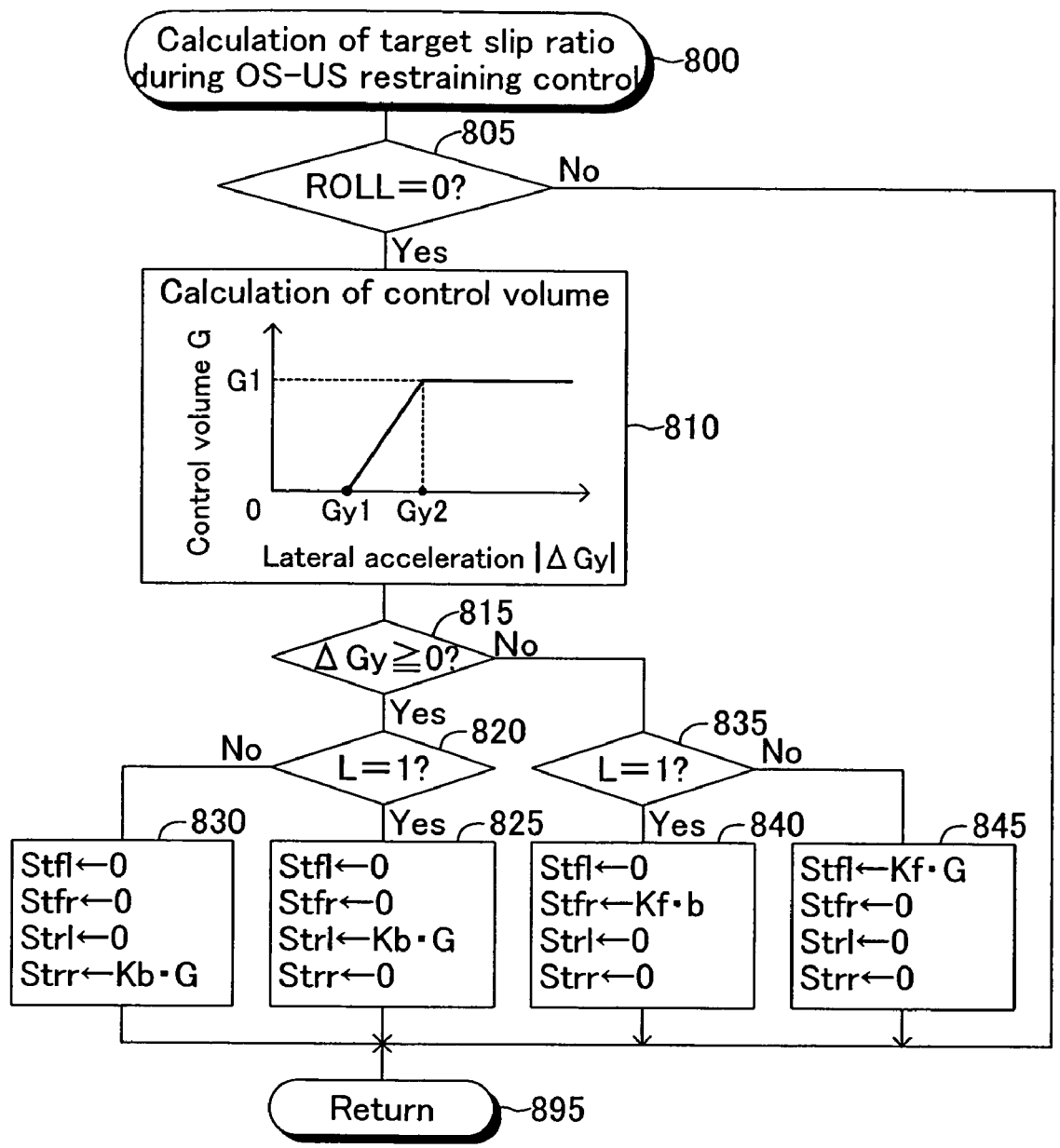
FIG. 8 is a flowchart executed by the CPU shown in FIG. 1 for calculating a target slip ratio during an OS-US restraining control.

Accordingly, in case where only the brake fluid pressure in the wheel cylinder Wfr of the front-right wheel is required to be increased, such as the case where the brake pedal BP is not operated and the program proceeds to the step 840 in FIG. 8, for example, the control valve SA1, change-over valve STR and pressure increasing valve PUfl shown in FIG. 2 are switched over to the second position and the pressure increasing valve PUfl and the pressure decreasing valve PDfr are respectively controlled, whereby only the brake fluid pressure in the wheel cylinder Wfr is increased by utilizing the high pressure generated from the high-pressure generating section 41 while keeping the brake fluid pressure in the wheel cylinder Wfl to be the fluid pressure at this time. Therefore, not only the front-right wheel FR but also the front-left wheel FL are included in the wheels to be controlled in this case. After executing the step 950, the CPU 61 proceeds to a step 995 for temporarily terminating this routine. As described above, the control mode is specified and the wheel to be controlled is specified.

Subsequently explained is the control of the braking force that should be exerted on each driving wheel. The CPU 61 repeatedly executes the routine shown in FIG. 10 once every predetermined period. Accordingly, the CPU 61 starts the process from a step 1000 at a predetermined timing, and then, proceeds to a step 1005 to determine whether the variable Mode is not "0". If the variable Mode is "0" here, the CPU 61 makes "NO" determination at the step 1005, and then, proceeds to a step 1010 for turning off (non-actuated state) all electromagnetic solenoids in the brake hydraulic control device 40 since the brake control is not required to be executed to each wheel. Thereafter, the CPU 61 moves to a step 1095 to temporarily terminate this routine. This allows to supply to each wheel cylinder W** brake fluid pressure according to the operating force of the brake pedal BP by the driver.

On the other hand, if the variable Mode is not "0" in the judgement at the step 1005, the CPU 61 makes "Yes" determination at the step 1005, and proceeds to a step 1015 for determining whether the variable Mode is "4" or not. If the variable Mode is not "4" (i.e., if the anti-skid control or the like that is other than the stability control upon turning is needed), the CPU 61 makes "NO" determination at the step 1015, and then, proceeds to a step 1020 for correcting the target slip ratio St of each wheel that is required upon executing only the stability control upon turning already set in FIG. 7 or FIG. 8, with respect to the wheel to be controlled wherein the value of the flag CONT is set to "1" at the step 950 in FIG. 9. Then, the CPU 61 moves to a step 1025. By this process, the target slip ratio St** of each wheel already set in FIG. 7 or FIG. 8 is corrected, every wheel to be controlled, by the target slip ratio of each wheel required for executing the control that is simultaneously executed with the stability control upon turning and corresponds to the value of the variable Mode.

If the variable Mode is "4" in the judgement at the step 1015, the CPU 61 makes "YES" determination at the step 1015, and directly moves to the step 1025, since it is unnecessary to correct the target slip ratio St of each wheel already set in FIG. 7 or FIG. 8. Moving to the step 1025, the CPU 61 calculates a slip ratio deviation ΔSt every wheel to be controlled based upon the value of the target slip ratio St, the value of the actual slip ratio Sa calculated at the step 515 in FIG. 5 and the formula disclosed in the step 1025.

Then, the CPU 61 proceeds to a step 1030 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 1025 every wheel to be controlled and the table disclosed in the step 1030.

Subsequently, the CPU 61 proceeds to a step 1035 where it controls the control valves SA1 and SA2 and the change-over valve STR shown in FIG. 2 based upon the hydraulic control mode set at the step 1030 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 9 can be achieved.

Figure 9:
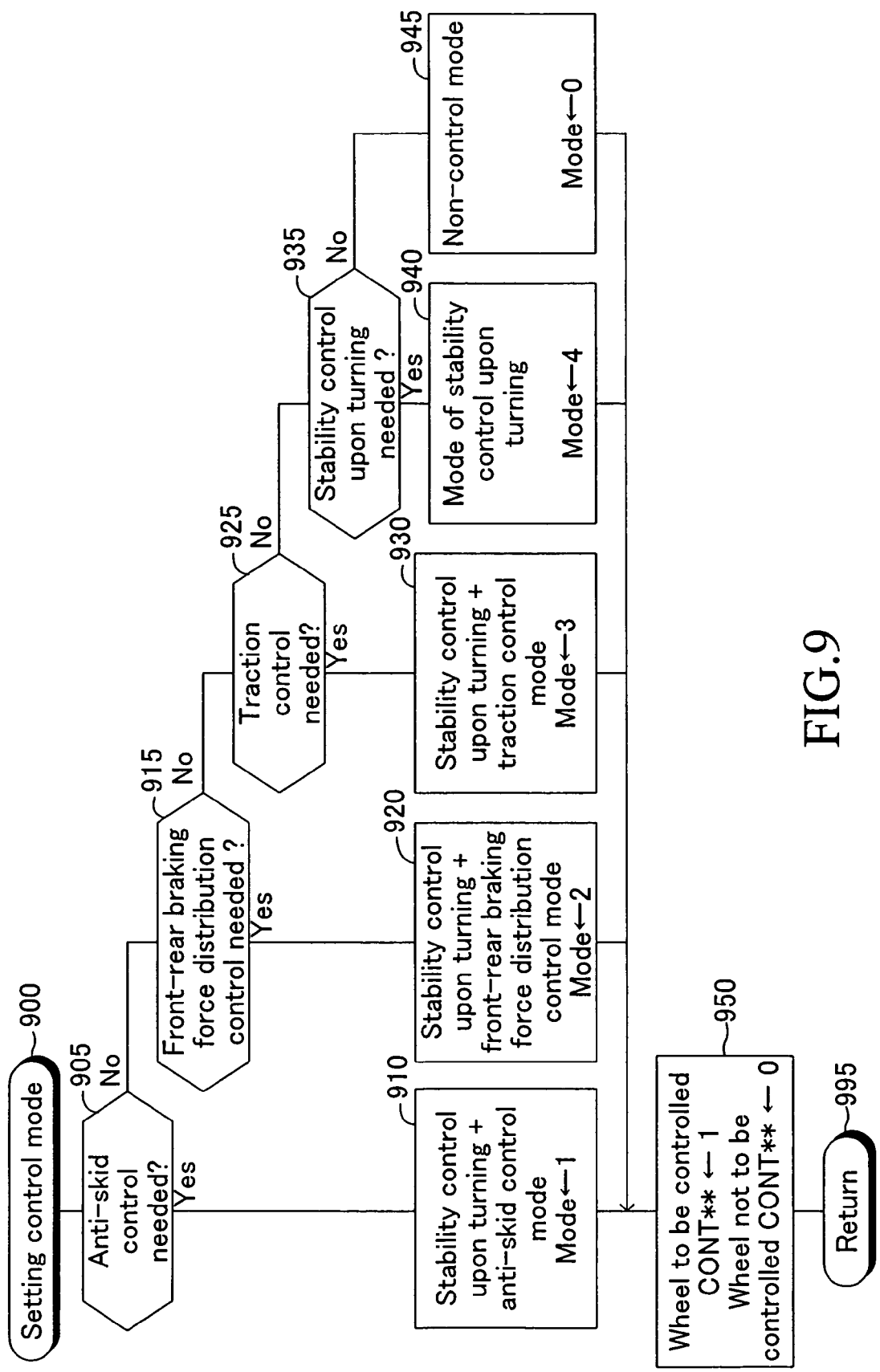
FIG. 9 is a flowchart showing a routine executed by the CPU shown in FIG. 1 for setting a control mode.
Figure 10:
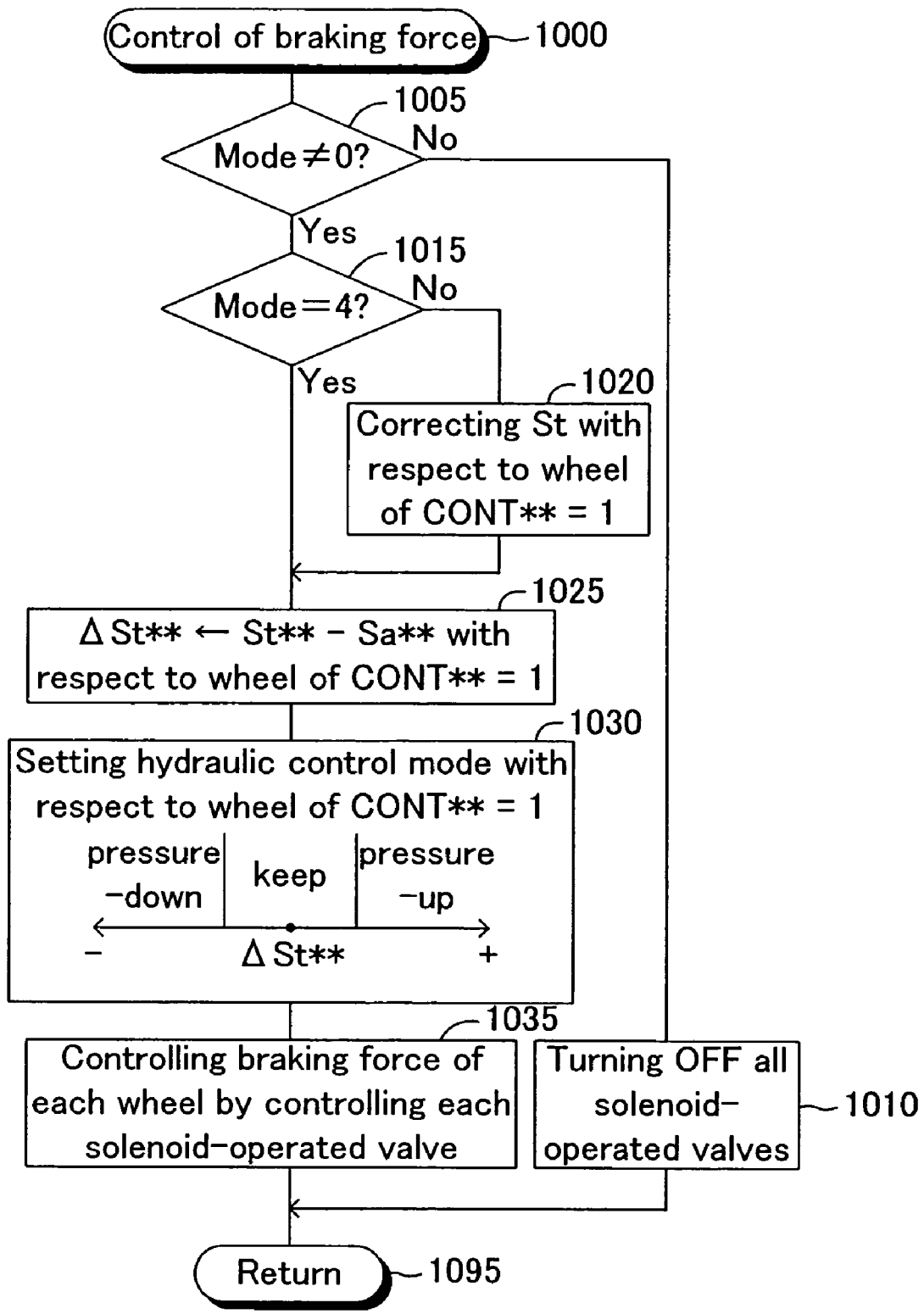
FIG. 10 is a flowchart showing a routine executed by the CPU shown in FIG. 1 for controlling braking force exerted on each wheel.

It is to be noted that, when the control mode set by the execution of the routine of FIG. 9 is the control mode (variable Mode=3) for executing the traction control mode or the control mode (variable Mode=4) for executing only the stability control upon turning, the CPU 61 sets, according to need, the opening smaller than the target throttle valve opening TAt by a predetermined amount as the target throttle valve opening instead of the target throttle valve opening TAt according to the operating amount Accp of the accelerator pedal AP, in order to reduce the driving force of the engine 31. By this process, the fuel injection device 33 injects fuel of an amount smaller than the amount according to the accelerator operating amount Accp by the driver, so that the engine 31 produces an output smaller than the output according to the accelerator operating amount Accp. Then, the CPU 61 proceeds to the step 1095 for temporarily terminating this routine.

As explained above, the vehicle motion control device according to the first embodiment of the invention utilizes that the detected lateral acceleration Gyd (its absolute value) based upon the output from the lateral acceleration sensor 54 takes a value obtained by adding a value corresponding to the roll angle to the actual lateral acceleration based upon the centrifugal force exerted on the vehicle and that the actual lateral acceleration can accurately be calculated and estimated as the estimated lateral acceleration Gye (Yr·Vso), whereby this device judges that there is a tendency an excessive roll angle occurs on the vehicle to thereby execute the predetermined roll-over preventing control when the increasing speed DGyd of the absolute value of the detected lateral acceleration exceeds the first predetermined value DGydref and the increasing speed DGye of the absolute value of the estimated lateral acceleration becomes smaller than the second predetermined value DGyeref (<DGydref), i.e., when the (absolute) value of the estimated lateral acceleration Gye is changed from its increasing state to the approximately constant state during when the detected lateral acceleration Gyd (its absolute value) increases.

Specifically, the judgement that there is a tendency an excessive roll angle occurs on the vehicle is made by utilizing the increase (change) in the detected lateral acceleration Gyd, not the detected lateral acceleration Gyd itself based upon the output from the lateral acceleration sensor 54. Accordingly, even when the precision of the detected lateral acceleration Gyd itself is low since there is an error in the mounting orientation or mounting angle of the lateral acceleration sensor 54 to the vehicle body, the judgement that there is a tendency an excessive roll angle occurs on the vehicle can accurately be made, resulting in being capable of suitably preventing the occurrence of an excessive roll angle.

Second Embodiment

Subsequently explained is a vehicle motion control device according to the second embodiment of the invention. This vehicle motion control device is different from the vehicle motion control device in the first embodiment in a specific technique for detecting that "the (absolute) value of the estimated lateral acceleration Gye is changed from its increasing state to the approximately constant state during when the (absolute) value of the detected lateral acceleration Gyd increases", upon making a judgement that there is a tendency an excessive roll angle occurs on the vehicle. Therefore, the second embodiment will be explained mainly about the different point.

As explained above, the estimated lateral acceleration Gye can take a value equal to the actual lateral acceleration and the detected lateral acceleration Gyd (its absolute value) takes a value obtained by adding the value corresponding to the roll angle to the actual lateral acceleration, so that the lateral acceleration deviation DGy represented by a formula (5) described below can be a value representing the roll angle. Therefore, the changing speed (increasing speed) DDGy (=d/dt(DGy)) of the lateral acceleration deviation can be a value representing the changing speed (increasing speed) of the roll angle.

$$DGy=|Gyd-Gye| \quad (5)$$

On the other hand, during a process in which the roll angle increases from its small value to the excessive value due to the turning run of the vehicle, the increasing speed of the roll angle generally increases when the vehicle motion is changed from the stage in which there is no tendency an excessive roll angle occurs on the vehicle (A region in FIG. 4) to the stage in which there is a tendency an excessive roll angle occurs on the vehicle (B region in FIG. 4).

Figure 11:
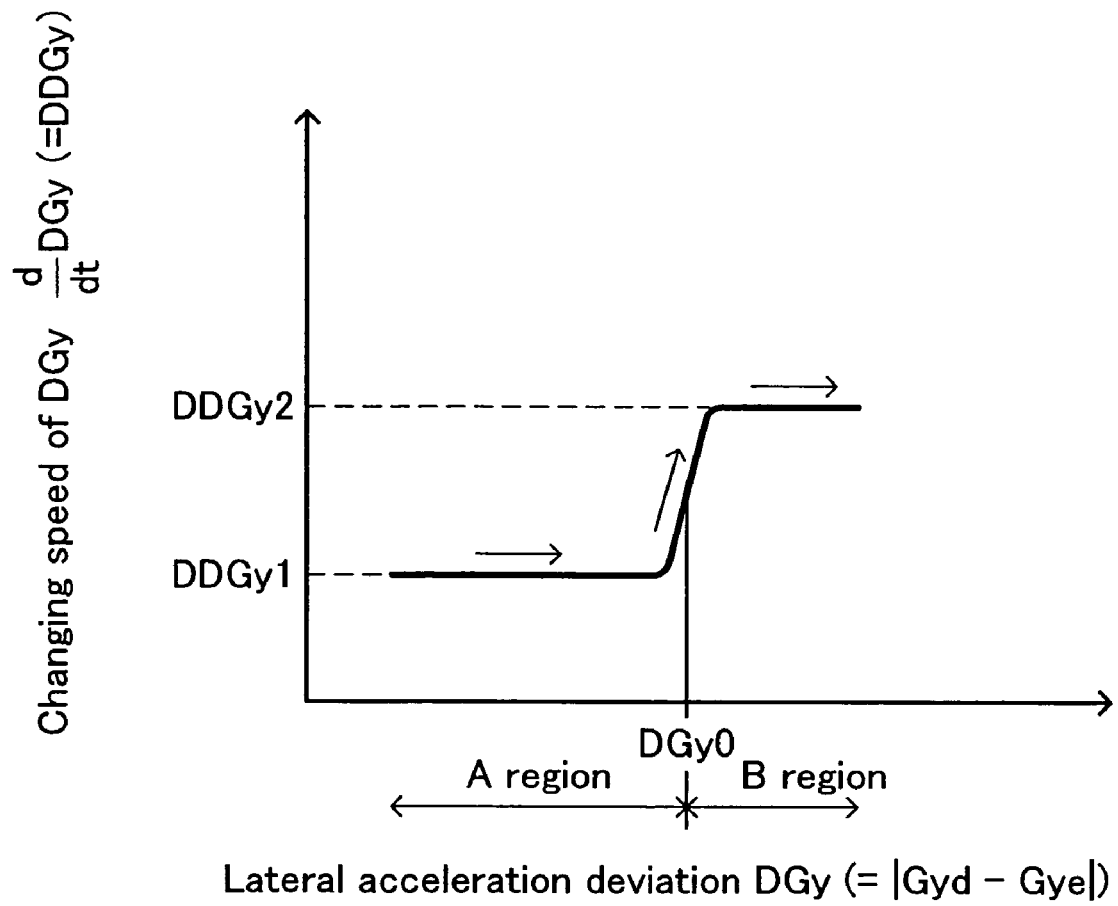
FIG. 11 is a graph showing a result of a relationship with passage of time between the lateral acceleration deviation and the changing speed of the lateral acceleration deviation in case where the vehicle runs by the same manner as in the case shown in FIG. 4, wherein the values are plotted one by one on a coordinate plane in which an abscissa is defined as the lateral acceleration deviation and an ordinate is defined as the changing speed of the lateral acceleration deviation.

The increase in the increasing speed of the roll angle will be explained with reference to FIG. 11 by using the lateral acceleration deviation DGy and the changing speed DDGy of the lateral acceleration deviation. FIG. 11 is a graph showing a result of a relationship with passage of time between the lateral acceleration deviation DGy and the changing speed DDGy of the lateral acceleration deviation in case where the vehicle runs by the same manner as in the case shown in FIG. 4, wherein the values are plotted one by one on a coordinate plane in which an abscissa is defined as the lateral acceleration deviation DGy and an ordinate is defined as the changing speed DDGy of the lateral acceleration deviation. Specifically, the abscissa corresponds to the roll angle and the ordinate corresponds to the increasing speed of the roll angle in FIG. 11.

As shown in FIG. 11, at the A region that is the region before the roll angle reaches DGy0, the increasing speed of the roll angle, i.e., the changing speed DDGy of the lateral acceleration deviation is kept to be approximately constant. On the other hand, when the roll angle passes the DGy0 as it increases, i.e., when the vehicle motion is changed from the motion in the A region to the motion in the B region, the changing speed DDGy of the lateral acceleration deviation rapidly increases from the DDGy1 to a DDGy2 that is greater than the DDGy1. Then, the changing speed DDGy of the lateral acceleration is kept to be approximately constant at the DDGy2 at the B region where the roll angle exceeds the DGy0.

Therefore, as can be understood from FIG. 11, when the ratio of the increase in the changing speed DDGy of the lateral acceleration deviation to the increase in the lateral acceleration deviation DGy (i.e., the slope in FIG. 11) exceeds some reference value, it can be judged that the vehicle motion is changed from the motion at the A region to the motion at the B region, and hence, it can be judged that there is a tendency an excessive roll angle occurs on the vehicle.

Therefore, the vehicle motion control device according to the second embodiment of the invention obtains one after another a ratio (DDDGy/DDGy) of the changing speed DDDGy (=d/dt(DDGy)=d²/dt²(DGy)) of the changing speed DDGy of the lateral acceleration deviation corresponding to the increase in the changing speed DDGy of the lateral acceleration deviation, to the changing speed DDGy (=d/dt(DGy)) of the lateral acceleration deviation corresponding to the increase in the lateral acceleration deviation DGy. When the changing speed DDGy of the lateral acceleration deviation is a positive value and when the ratio (DDDGy/DDGy) exceeds a reference value gradref, this device judges that there is a tendency an excessive roll angle occurs on the vehicle, thereby executing the aforesaid roll-over preventing control.

Actual Operation in the Second Embodiment

Subsequently, the actual operation of the motion control device according to the second embodiment will be explained. The CPU 61 of this device executes each routine of the routines shown in FIGS. 5 to 10 executed by the CPU 61 in the first embodiment except for the routine shown in FIG. 7, and executes a routine shown with flowchart in FIG. 12 instead of the routine shown in FIG. 7. The routine shown in FIG. 12 that is peculiar to the second embodiment will only be explained hereinbelow. It should be noted that same numerals are given to steps same as those shown in FIG. 7.

Figure 12:
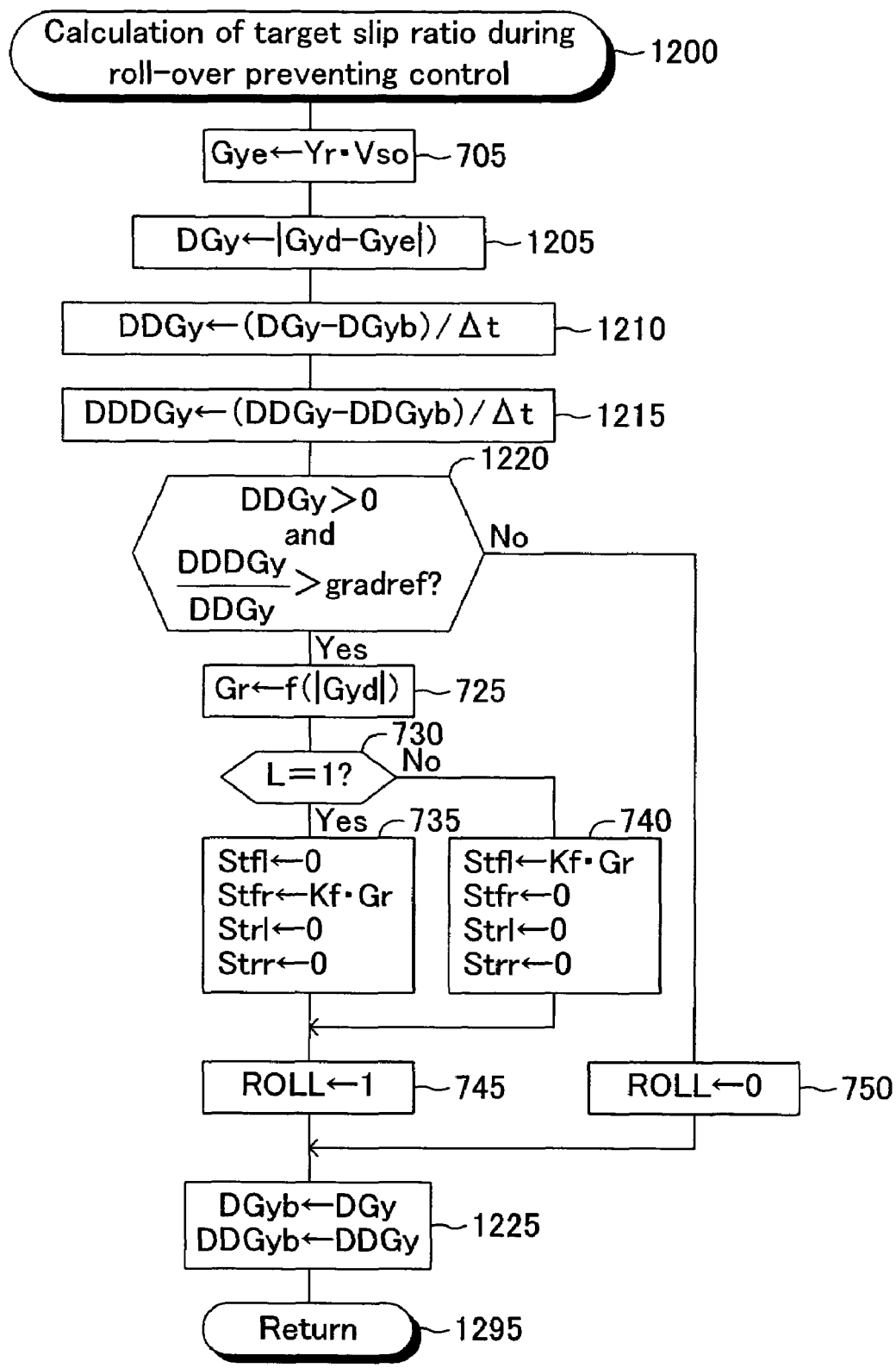
FIG. 12 is a flowchart executed by a CPU of a vehicle motion control device according to a second embodiment of the present invention for calculating a target slip ratio during the roll-over preventing control.

The CPU 61 repeatedly executes a routine shown in FIG. 12, that is for calculating the target slip ratio of each wheel required to determine the braking force that should be exerted on each wheel upon executing only the above-mentioned roll-over preventing control, once every predetermined period. Accordingly, the CPU 61 starts the process from a step 1200 at a predetermined timing, and then proceeds to a step 705 to calculate the estimated lateral acceleration Gye by the same manner in the step 705 in FIG. 7.

Then, the CPU 61 moves to a step 1205 to obtain the lateral acceleration deviation DGy based upon the detected lateral acceleration Gyd obtained from the lateral acceleration sensor 54, the estimated lateral acceleration Gye calculated at the step 705 and the formula described in the step 1205 based upon the above-mentioned formula (5). Then, the CPU 61 proceeds to a step 1210 to obtain the changing speed DDGy of the lateral acceleration deviation based upon the lateral acceleration deviation DGy calculated at the step 1205, the last-time value DGyb of the lateral acceleration deviation renewed at a step 1225 described later during the execution of the last-time this routine and the formula described in the step 1210. The symbol Δt is the predetermined time that is an operation period of this routine.

Then, the CPU 61 proceeds to a step 1215 to obtain the changing speed DDDGy of the changing speed of the lateral acceleration deviation based upon the changing speed DDGy of the lateral acceleration deviation calculated at the step 1210, the last-time value DDGyb of the changing speed of the lateral acceleration deviation renewed at the step 1225 described later during the execution of the last-time this routine and the formula described in the step 1215. The symbol Δt is the predetermined time that is an operation period of this routine.

Then, the CPU 61 moves to a step 1220 to determine whether the changing speed DDGy of the lateral acceleration deviation is a positive value and the ratio (DDDGy/DDGy) of the changing speed DDDGy of the changing speed of the lateral acceleration deviation to the changing speed DDGy of the lateral acceleration deviation is greater than the reference value gradref or not.

Supposing that the condition at the step 1220 is established. The CPU 61 makes "YES" determination at the step 1220, and executes processes same as those at the steps 725 to 745 in FIG. 7 for calculating the target slip ratio of each wheel upon executing the roll-over preventing control, and then, proceeds to a step 1225.

On the other hand, if it is supposed that the condition at the step 1220 is not established, the CPU 61 makes "NO" determination at the step 1220 and executes the same process as that at the step 750 in FIG. 7. Thereafter, the CPU 61 immediately proceeds to the step 1225. When moving to the step 1225, the CPU 61 stores the (this-time) value of the lateral acceleration deviation DGy as the last-time value DGyb of the lateral acceleration deviation and stores the (this-time) value of the changing speed DDGy of the lateral acceleration deviation as the last-time value DDGyb of the changing speed of the lateral acceleration deviation. Then, the CPU 61 moves to a step 1295 to temporarily terminate this routine. In case where the condition at the step 1220 is established, the target slip ratio of each wheel that is required to determine the braking force that should be exerted on each wheel upon executing only the roll-over preventing control is decided as described above.

As explained above, when the changing speed DDGy of the lateral acceleration deviation is a positive value and the ratio (DDDGy/DDGy) of the changing speed DDDGy of the changing speed of the lateral acceleration deviation to the changing speed DDGy of the lateral acceleration deviation is greater than the reference value gradref, i.e., when the estimated lateral acceleration Gye (its absolute value) is changed from its increasing state to the approximately constant state during when the detected lateral acceleration Gyd (its absolute value) increases, the vehicle motion control device according to the second embodiment of the present invention judges that there is a tendency an excessive roll angle occurs on the vehicle, thereby executing the predetermined roll-over preventing control.

Specifically, this allows to make the judgement that there is a tendency an excessive roll angle occurs on the vehicle by utilizing the increase (change) in the value of the detected lateral acceleration Gyd, not the detected lateral acceleration Gyd itself based upon the output from the lateral acceleration sensor 54. Therefore, the judgement that there is a tendency an excessive roll angle occurs on the vehicle can accurately be made, thereby being capable of suitably preventing the occurrence of an excessive roll angle, like the first embodiment.

The present invention is not limited to the above-mentioned embodiments. Various modifications can be applied within the scope of the present invention. For example, although the estimated lateral acceleration Gye is calculated based upon the yaw rate Yr obtained by the yaw rate sensor 56 as the motion state quantity in each embodiment, the estimated lateral acceleration Gye may be calculated based upon a difference, as motion state quantity, between a wheel speed of wheels at the left side of the vehicle body and a wheel speed of wheels at the right side of the vehicle body.

Specifically, the estimated lateral acceleration Gye can be calculated according to a formula (6) described later from a difference between the average value Vwlave of the wheel speed Vwfl of the front-left wheel FL and the wheel speed Vwrl of the rear-left wheel RL that are the wheel speeds of the wheels at the left side of the vehicle body obtained from the wheel speed sensors 51$fl$ and 51$rl$ as described later and the average value Vwrave of the wheel speed Vwfr of the front-right wheel FR and the wheel speed Vwrr of the rear-right wheel RR that are the wheel speeds of the wheels at the right side of the vehicle body obtained from the wheel speed sensors 51fr and 51rr as described later, the estimated body speed Vso and the value of the wheel tread T(m).

$$Gye=(Vwrave-Vwlave)\cdot Vso/T \qquad (6)$$

Further, instead of the difference between the average wheel speed Vwlave of the wheel speed Vwfl of the front-left wheel FL and the wheel speed Vwrl of the rear-left wheel RL and the average wheel speed Vwrave of the wheel speed Vwfr of the front-right wheel FR and the wheel speed Vwrr of the rear-right wheel RR in the above-mentioned embodiment, the estimated lateral acceleration Gye may be calculated based upon any one of the differences between the wheel speed Vwfl of the front-left wheel FL and the wheel speed Vwfr of the front-right wheel FR, between the wheel speed Vwrl of the rear-left wheel RL and the wheel speed Vwrr of the rear-right wheel RR, between the wheel speed Vwfl of the front-left wheel FL and the wheel speed Vwrr of the rear-right wheel RR and between the wheel speed Vwrl of the rear-left wheel RL and the wheel speed Vwfr of the front-right wheel FR.

What is claimed is:

1. A vehicle motion control device comprising: estimated lateral acceleration calculating means that obtains a motion state quantity showing a motion state of a vehicle and calculates, based upon the obtained motion state quantity, a lateral acceleration based upon centrifugal force exerted on the vehicle as an estimated lateral acceleration; a lateral acceleration sensor that obtains a lateral acceleration exerted on the vehicle as a detected lateral acceleration by detecting a value of a component of external force exerted on the vehicle in the side-to-side direction; tendency judging means that judges that there is a tendency in which a roll angle of the vehicle increases by detecting that the estimated lateral acceleration is changed from its increasing state to approximately constant state during when the detected lateral acceleration increases; and specific process executing means that executes a specific process for restraining the roll angle from increasing, when it is judged that there is a tendency in which the roll angle increases.

2. A vehicle motion control device claimed in claim 1, wherein the estimated lateral acceleration calculating means obtains a yaw rate of the vehicle as the motion state quantity and calculates the estimated lateral acceleration based upon the obtained yaw rate.

3. A vehicle motion control device claimed in claim 1, wherein the tendency judging means is configured to judge that there is a tendency in which the roll angle increases when the increasing speed of the detected lateral acceleration exceeds a first predetermined value and the increasing speed of the estimated lateral acceleration becomes smaller than a second predetermined value that is smaller than the first predetermined value.

4. A vehicle motion control device claimed in claim 1, wherein the tendency judging means is configured to calculate a deviation between the detected lateral acceleration and the estimated lateral acceleration as a lateral acceleration deviation and to judge that there is a tendency in which an the roll angle increases based upon the change in the changing speed of the lateral acceleration deviation.

5. A vehicle motion control device claimed in claim 4, wherein the tendency judging means is configured to judge that there is a tendency in which the roll angle increases when the ratio of the change in the changing speed of the lateral acceleration deviation to the change in the lateral acceleration deviation becomes greater than a predetermined reference value.

6. A vehicle motion control device claimed in claim 1, wherein the specific process executing means is configured to execute, as the specific process, a process for exerting braking force for generating a yawing moment on the vehicle in the direction opposite to the turning direction of the vehicle on a predetermined wheel.

7. A vehicle motion control device comprising:
estimated lateral acceleration calculating means that calculates an estimated lateral acceleration by multiplying a yaw rate of the vehicle detected by a yaw rate sensor by an estimated vehicle body speed;
a lateral acceleration sensor that obtains a lateral acceleration exerted on the vehicle as a detected lateral acceleration by detecting a value of a component of external force exerted on the vehicle in a side-to-side direction;
tendency judging means that judges that there is a tendency in which a roll angle of the vehicle increases by detecting that the estimated lateral acceleration is changed from its increasing state to approximately constant state during when the detected lateral acceleration increases; and
specific process executing means that executes a specific process for restraining the roll angle from increasing, when it is judged that there is a tendency in which the roll angle increases.

* * * * *